United States Patent [19]

Coulthard

[11] 4,294,694
[45] Oct. 13, 1981

[54] ANAEROBIC FILTER

[76] Inventor: John L. Coulthard, 16 Newry St., Richmond, Victoria, Australia

[21] Appl. No.: 24,083

[22] Filed: Mar. 26, 1979

[30] Foreign Application Priority Data

Mar. 28, 1978 [AU] Australia .............................. PD3787

[51] Int. Cl.³ ............................................... C02C 1/04
[52] U.S. Cl. .................................... 210/150; 210/605
[58] Field of Search .................. 210/150, 151, 17, 15, 210/242 AS, 242 R, 242 A, DIG. 25, DIG. 26, 488, 500 R, 605, 610, 611, 615

[56] References Cited

U.S. PATENT DOCUMENTS

| 3,113,102 | 12/1963 | Schulze | 210/150 |
|---|---|---|---|
| 3,231,490 | 1/1966 | Fry | 210/17 |
| 3,371,033 | 2/1968 | Simmons et al. | 210/17 |
| 3,617,541 | 11/1971 | Pan | 210/17 |
| 3,794,583 | 2/1974 | Rhodes | 210/DIG. 26 |
| 4,141,823 | 2/1979 | Smith | 210/17 |

Primary Examiner—Frank Sever
Attorney, Agent, or Firm—Cushman, Darby & Cushman

[57] ABSTRACT

A substrate for biological filters and particularly anaerobic filters, the substrate comprising a plurality of elongate strips of plastics material having surfaces suitable for the attachment thereto of biologically-active organisms, the strips being arranged in use to be suspended in an array in a flowing stream of the liquid medium so that the strip and/or surfaces can randomly move in response to the flow to cause a change in the flow path past the strips.

6 Claims, 9 Drawing Figures

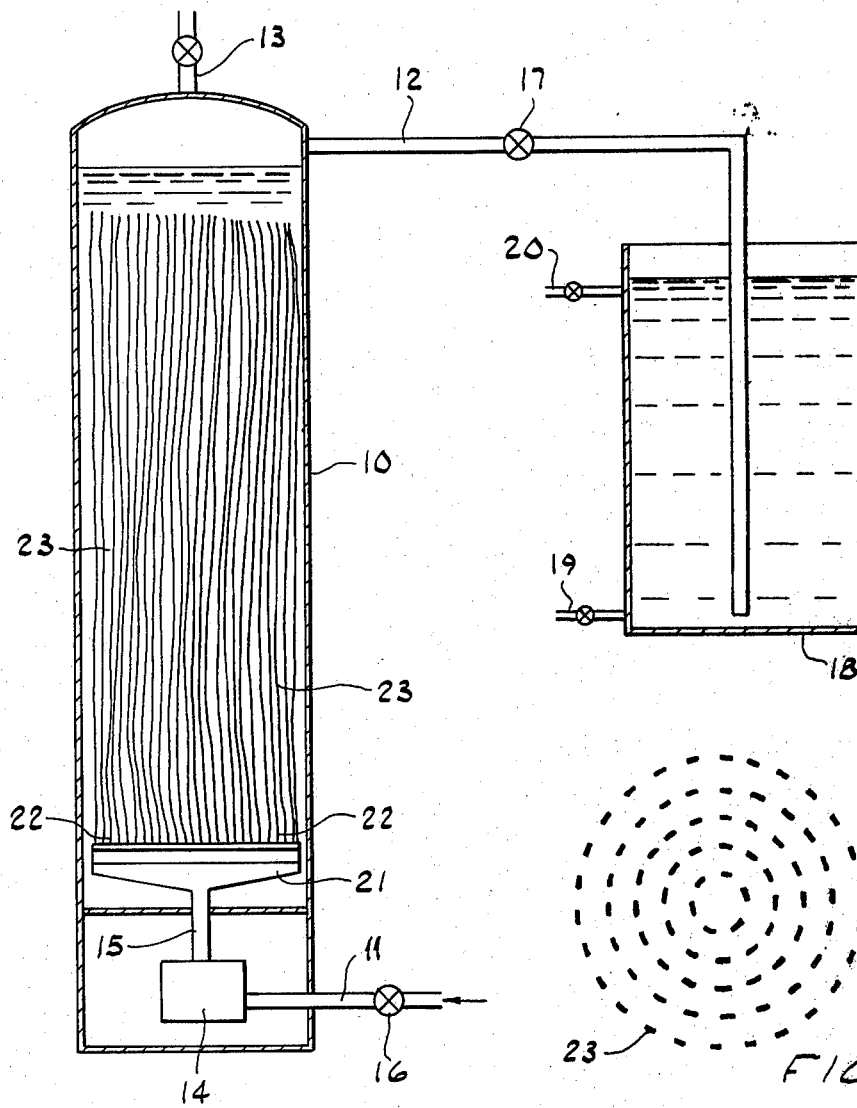
FIG. 1a
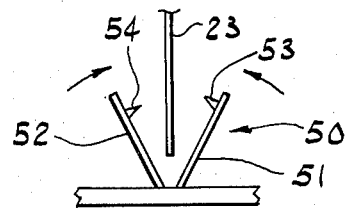
FIG. 1b
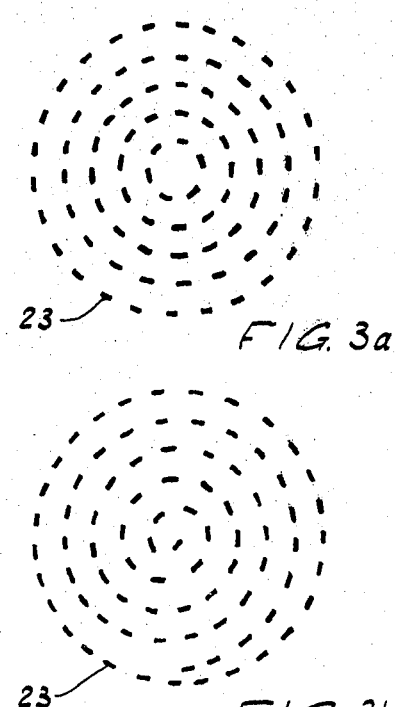
FIG. 3a
FIG. 3b

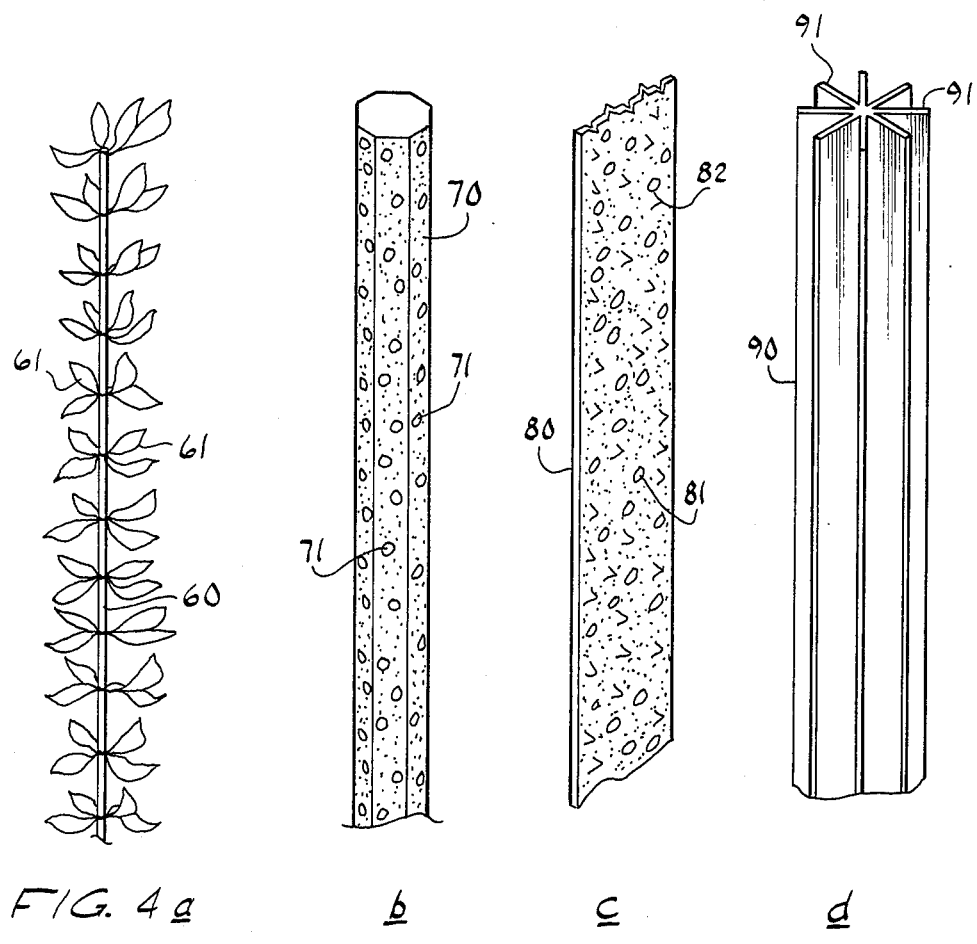
FIG. 4 a   b   c   d

ANAEROBIC FILTER

This invention relates to biological filters for the treatment of a liquid medium in particular to a substrate for use in such filters and especially for use in anaerobic digesters and fermentation apparatus.

Biological filters for the treatment of polluted liquid media such as sewage, organic wastes or industrial effluents use biologically active organisms to biochemically degrade the media, e.g. into gases and inert non polluting disposable sludge.

Activated sludge plants and biological filters commonly used to treat sewage rely on aerobic microorganisms to oxidise organic pollutants biologically to carbon dioxide and water, the residue being disposable sludge which can be used as fertilizer.

Anaerobic filters operate on the use of a population of micro-organisms which grow in the absence of oxygen and convert polluted matter such as sewage, organic wastes or industrial effluents, to a mixture of carbon dioxide and methane, and a sludge of inert nitrogenous matter which may be collected and used as fertilizer. One such method and apparatus for anaerobic fermentation is disclosed in co-pending Australian Pat. No. 480,689 and Application No. 16108/76.

In both types of biological filter the effective operation of the process depends on the aerobic or anaerobic micro-organisms being able to attack the whole mass of polluted media and for this purpose an inert substrate is provided on which the mirco-organisms grow and through the polluted media flow to allow the biochemical degeneration.

Conventional anaerobic biological filter systems consist of a closed tank which contains a flooded bed of an inert filter substrate such as the type used in biological filters and up through which the polluted medium is passed. The filter substrate is conventionally stones or plastics shapes in rigid formation defining comparatively narrow flow paths for the influent. The substrate constitutes an inert surface to which methanogenic bacteria adhere, the bacteria serving to break down the polluted matter into carbon dioxide, methane and inert sludge. It is important that the surface area of the substrate is as large as possible to ensure that there is a high exposure of the polluted medium to the degenerative bacteria.

However, a problem with such filter substrates is that the comparatively narrow passageway defined between the stones or plastics shapes give rise to clogging and therefore limits the effective solids concentration of the polluted media to about 3000 mg/l B.O.D. (biochemical oxygen demand). The clogging of the substrate requires constant back-washing and limits the solids concentration of the influent. Simply increasing the cross-sectional area of the flow path within the filter substrate does not completely solve the problem because when the flow path becomes too great the bacterial seed which activates the biochemical degradation of the polluted medium tends to flow straight through the apparatus reducing the bacterial growth on the filter substrate and causing volatile acid inhibition of the partially treated polluted medium.

It is an object of the present invention to provide an improved substrate for use in biological filters.

According to one aspect of the present invention there is provided a substrate for a biological filter for the treatment of a liquid medium, comprising: at least one elongate strip of plastics material having surfaces suitable for the attachment thereto of biologically-active organisms, the strip being arranged in use to be suspended in a flowing stream of the liquid medium so that the strip and/or surfaces can randomly move in response to the flow to cause a change in the flow path past the strip.

The surfaces may be constituted by surface portions of the strip itself flexing to vary the flow path past the strip. Alternatively, the strip may be provided with projecting flanges which extend along the length of the strip. In a further embodiment the strip may be provided with spaced projecting members in the form of leaf-like structures which are flexibly secured to the strip and randomly move in the flow.

In a further embodiment a planar strip may be provided having a plurality of indentations and projections on both surfaces, the strip being flexible so that the identations and projections act as the projecting surfaces.

In a preferred embodiment the filter substrate comprises a plurality of strips of plastics as defined above arranged and spaced apart to extend along the length of a biological filter tank. The strips may be secured to the base of the tank so that they float within the tank or alternatively the strips may be weighted and suspended from the upper end of the tank.

According to a further aspect of the present invention there is provided a biological filter for the treatment of a liquid medium comprising:

a tank having an inlet and an outlet, the inlet of the tank being arranged to be connected to a source of polluted liquid medium, said medium being arranged to flow through the tank past a substrate as defined above.

The tank is preferably arranged to be used with the flow extending from the inlet to the outlet in a vertical direction and the strips are preferably secured to the tank adjacent the inlet of the tank and are arranged to randomly float within the tank. In an alternative embodiment the strips may be weighted and may be secured to the upper end of the tank adjacent the outlet thereof and are arranged to hang freely downwardly within the tank. The strips may be arranged within the tank individually spaced on concentric rings relative to the longitudinal axis of the tank or alternatively, may be arranged in a spiral configuration. Other configurations include linear rows of the strips when viewed in cross-section filling the total cross-section of the tank.

Each strip is preferably constructed of polyvinyl chloride or polyurethane.

Various embodiments of the present invention will now be described by way of example only with reference to the accompanying drawings in which:

FIG. 1 (a) is a schematic side-on view of an anaerobic digester,

FIG. 1 (b) is an enlarged view of part of the digester shown in FIG. 1 (a),

Figure 2:
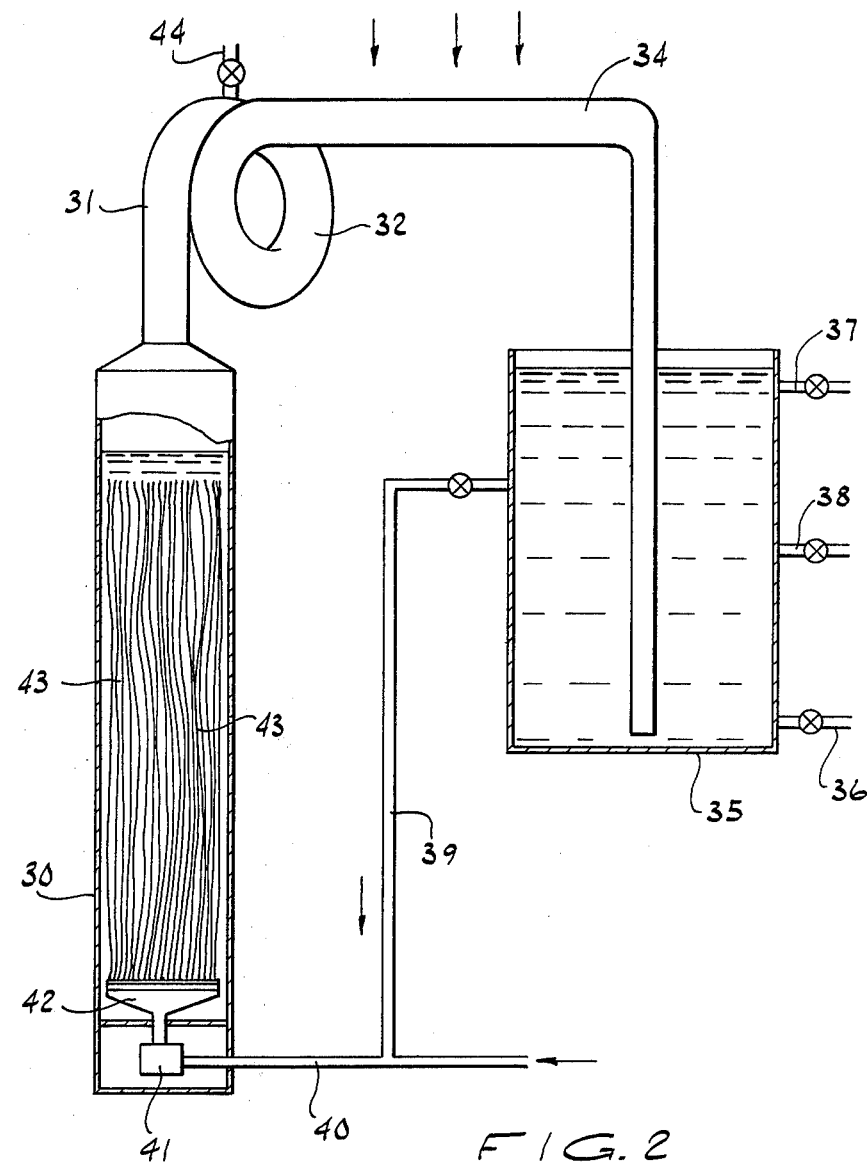
FIG. 2 is a schematic side-on view of a further form of anaerobic digester incorporating a recycling system, FIGS. 3 (a) and (b) are plan views of an arrangement of substrates for use in the tanks illustrated in FIGS. 1 and 2, and FIGS. 4 (a), (b), (c) and (d) are views of various alternative forms of strips which constitute the substrates.

An anaerobic digester as illustrated in FIG. 1 (a) comprises a tank 10 of cylindrical form arranged to be stood vertically with an inlet 11 at the base and an outlet 12 adjacent the top with a gas collection outlet 13 provided at the top of the tank. The tank is a sealed unit and is filled with polluted media such as sewage, organic wastes or industrial effluents by a pump 14 positioned within an inlet line 15 and controlled by a valve 16. The outlet of the pump communicates via a valve 17 into the base of an open collector 18 having an outlet 19 in the base of the collector to remove the inert sludge produced after the anaerobic filtration process and an outlet 20 at the top of the collector to collect the scum which floats on the top of the ejected matter.

A diffuser 21 is positioned in the base of the digester and is arranged to evenly distribute the influent across the whole cross-section of the base.

Secured to the top of the diffuser 21 are the ends 22 of a plurality of plastics strips 23 which are arranged to extend longitudinally of the tank 10 so that each strip extends from the bottom to the top of the tank. The plurality of plastics strips float within the tank to act as a filter substrate on which micro-organisms adhere.

In FIG. 2 a similar digester tank 30 is illustrated. The tank is in the form of a long cylinder of approximately 18 inches in diameter, the output 31 is provided with an inverted bend 33, which induces improved mixing of the liquid medium as it leaves the tank. The ejected matter is passed along a solar panel in the form of a 12 inch diameter pipe 34 and the ejected matter is heated to further advance the anaerobic fermentation. The treated matter is eventually passed into a collector 35 having a sludge removal outlet 36 at the base, and a scum removal 37 at the top with a treated effluent outlet 38 midway between the base and top.

Matter which is still partially polluted is recycled back into the tank 30 via a pipe 39 which enters the feed pipe 40 downstream of a pump 41 which feeds new polluted and recycled matter into the tank via a diffuser 42.

The digester may either continually recycle the polluted matter or may recycle in batches with frequent or continuous removal of low specific gravity liquids and inert solids.

The tank 30 is provided with a similar arrangement of filter substrates in the form of floating strips 43 or plastics material secured to the base of the tank. The solar heating is to increase the efficiency of the system because the system has an optimum operating temperature of 35° C. The top of the tank is provided with a gas liquid separator 44 to ensure that gas can be removed from the tank during the anaerobic fermentation. In some processes the methane is used to heat the influent to the optimum working temperature, but if solar heating is used the methane can be used for other purposes.

FIGS. 3 and 4 illustrate the precise arrangement of the filter substrate for use in the anaerobic digester illustrated in FIGS. 1 (a) and 2. The filter substrate comprises strips of plastics material preferably polyurethane or polyvinyl chloride which are secured to the base of the tank by means of spring clips 50 illustrated in FIG. 1 (b), these clips have outwardly projecting arms 51 and 52 each carrying a tooth 53 and 54, the arms being arranged to be pressed together so that the teeth engage the lower end 22 of the strip to firmly secure the strip against the base of the tank. As shown in FIGS. 3 (a) and 3 (b), the strips are arranged in either concentric circles as shown in FIG. 3 (a) or alternatively in the form of a "Catherine-wheel" or spiral arrangement such as that illustrated in FIG. 3 (b). For the digesters shown in FIGS. 1 and 2, the concentric circles are arranged about 6 inches apart and the strips are spaced at 4 inch intervals around each circle or the path of the spiral or "Catherine-wheel" arrangement. The strips float upwardly to the top of the tank so that the interior of the tank is uniformly filled by the strips. Although the strips are preferably arranged in the form illustrated in FIGS. 3 (a) and 3 (b), other alternative forms can be used, particularly in a tank of rectangular cross-section. For instance, the strips can be arranged in linear rows each strip and each row being equally spaced apart.

As illustrated in FIGS. 4 (a) to 4 (d), the strips can be of many designs. In FIG. 4 (a), a strip 60 has secured thereto at equally spaced locations, a plurality of comparatively flat leaves 61 which flex relative to the longitudinally extending strip 60. The leaves constitute the substrates of the filter and the total width of the strip is about one inch. In FIG. 4 (b) the strip is in the form of an elongate tube 70 of octagonal cross-section having a plurality of holes 71 in the walls. The tube is sufficiently flexible to allow the surface portions of the periphery to constitute the surfaces of the substrate on which the micro-organisms adhere. As the strips float in the polluted matter the strips flex longitudinally to operate in a manner akin to seaweed, thereby continually varying the flow path of the influent through the length of the tank.

In FIG. 4 (c) the strips comprise substantially planar lengths 80 of plastics material of rectangular cross-section, having a plurality of indentations 81 of prismatic cross-section causing alternating indentations 81 and projections 82 on each surface of the strip. As the strips float they flex causing the surfaces caused by the indentations 81 and projections 82 to vary the flow path through the tank.

In FIG. 4 (d) the strips comprise a length of plastics material having a plurality of outwardly extending flanges 91 along the length of the strip, the flanges flex as the strip floats in the polluted matter to again vary the flow path of the influent through the tank.

The various designs of filter substrates illustrated in FIG. 4 are merely by way of example and it is understood that as long as the strips have a degree of flexibility so that they ensure that the filter is a non-rigid construction thereby constantly changing the flow path of the influent, any suitable shape or variation of form can be used.

An important aspect of the substrate is that it extends throughout the length of the tank and provides a substantially large surface area over which the polluted medium passes so that the methanogenic bacteria which causes the biological breakdown into carbon dioxide, methane and waste sludge, can adhere in clusters to the surface portions of the strips to react with the influent as it passes the clusters of bacteria. As the clusters grow heavier with consequent particle retention the baceteria closest to the strip eventually suffocate and die and the movement and floating action of the strip causes the clusters to drop off to be replaced by new layers of bacteria, thereby constantly unclogging the substrates and ensuring an efficient flow through the tank.

Although in a preferred embodiment the strips are secured to the base of the tank and allowed to float to the top it is understood that weights may be attached to the bottom of the strips and the strips may be attached to the top of the tank to hang in a loose manner so that they move randomly within the flow. As long as the filter element is not rigid there will be a constant change of flow path and regrowth of methanogenic bacterial clusters on the substrates to cause the bacterial breakdown of the polluted matter and production of carbon dioxide and methane to render the sludge as harmless nitrogenous waste which can be used as fertilizer.

Anaerobic digesters with the filter substrate described above allow polluted media with a higher solids concentration to be treated efficiently and effectively at ambient temperatures. Convention anaerobic plants using filter substrates in the form of stones and rigid plastics elements only operate satisfactorily with polluted matter having a B.O.D. content of up to a maximum of 3,000 mg/l whilst the digester in accordance with the present invention can satisfactorily operate on influent with a B.O.D. content of up to 10,000 mg/l and this can be reduced to 1,100 mg/l that is an 89% reduction. The C.O.D. (chemical oxygen demand) reduction can be up to 92% and it has been found that the filter does not block even after extensive use. Another advantage of the use of the filter substrate described above is that the high surface area of the substrates prevents flow of the methanogenic bacterial seed straight through the digester thereby contaminating the treated output. By positioning the plastics media with a high surface area within the whole of the digester tank, the bacteria is arrested by the strips thereby reducing the escape of the seed and ensuring efficient biological degradation. These filter substrates produce a particularly efficient reduction of methane and improve the overall efficiency of the plant.

It is considered that the filter substrates described above can be used in many types of aerobic and anaerobic biological filters and are not specifically restricted to use in fermentation apparatus of the kind described above and in my co-pending Australian Pat. No. 480,689 and Application No. 16108/76.

Having now described my invention, what I claim is:

1. A biological filter for the treatment of a liquid medium comprising: a tank having an inlet and an outlet, the inlet of the tank being arranged to be connected to a source of polluted liquid medium, whereby said medium can flow through the tank; means for sealing said tank sufficiently to effect anaerobic conditions in said tank; an array of a plurality of vertically elongated strips of plastics material disposed in the tank and randomly floating in the liquid medium present in the tank, said strips having surfaces along essentially their entire lengths which are provided with a plurality of indentations and which are suitable for the attachment thereto of anaerobic biologically-active organisms, at least said surfaces being sufficiently flexible to move randomly so as to cause the flow path of the liquid medium to vary and so as to cause dead clusters of anaerobic organisms to break away from the surfaces thereby permitting renewed growth on the surfaces.

2. A biological filter according to claim 1, wherein the strip or strips are constructed of polyvinylchloride or polyurethane.

3. A biological filter according to claim 1, wherein the tank is arranged to be used with the flow extending from the inlet to the outlet in a vertical direction.

4. A biological filter according to claim 1, wherein a plurality of the strips is arranged in concentric arrays around the longitudinal axis of the tank.

5. A biological filter according to claim 1, wherein the strips are arranged spaced about a spiral configuration.

6. A biological filter for the anaerobic digestion of a liquid medium comprising: a vertically elongated tank having a vertically elongated liquid treatment space; a liquid inlet at the bottom of the tank for supplying the liquid medium to be treated to the space; a liquid outlet at the top of the tank for discharging treated liquid from the space; a gas outlet at the top of the tank for discharging gas from said space; said inlet and outlets being arranged such that when liquid medium is present the space is effectively sealed so as to produce anaerobic conditions therein; and an array of a plurality of vertically elongated strips of plastics material disposed in the space so as to extend essentially the length of the space, said strips being secured to the tank adjacent the inlet of the tank and randomly floating in the liquid medium present in the tank, said strips having surfaces along essentially their entire lengths which are provided with a plurality of indentations and which are suitable for the attachment thereto of anaerobic biologically-active organisms, at least said surfaces being sufficiently flexible to move randomly so as to cause the flow path of the liquid medium to vary and so as to cause dead clusters of anaerobic organisms to break away from the surfaces thereby permitting renewed growth on the surfaces.

* * * * *